Oct. 11, 1927.
W. E. HAMILTON ET AL
1,644,779
TUNNEL DRIER
Filed Feb. 13, 1922
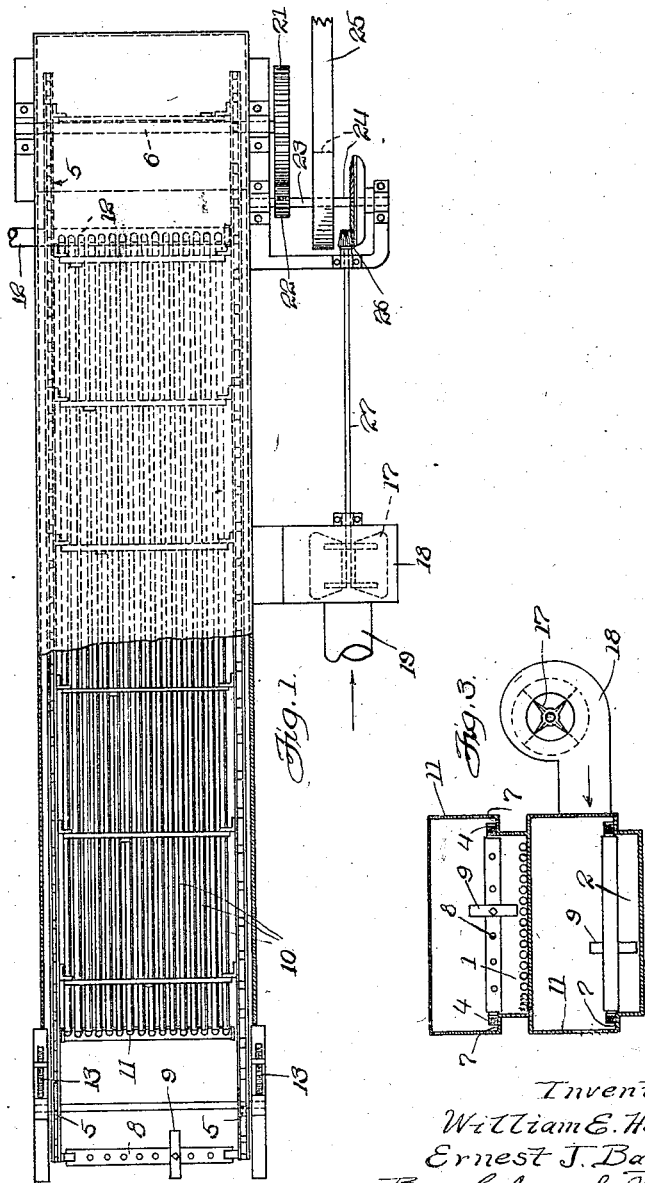
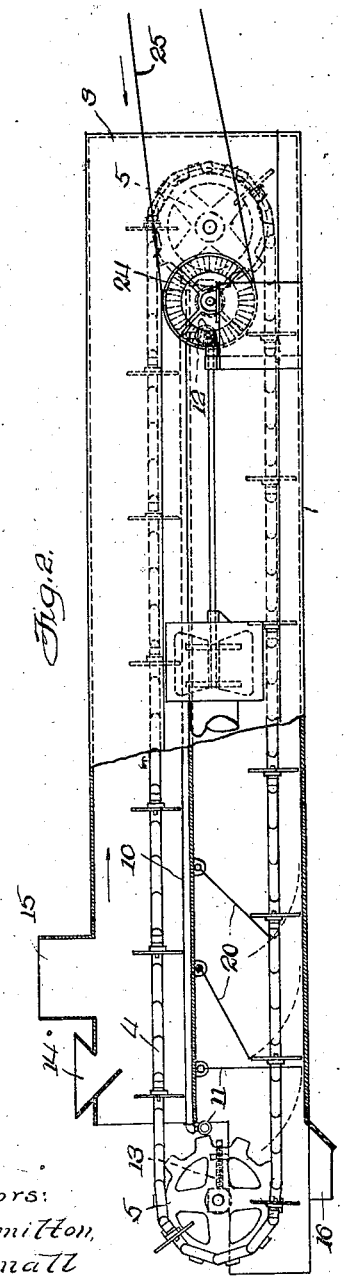
Inventors:
William E. Hamilton,
Ernest J. Bagnall
By Glenn S. Noble Att'ys Patented Oct. 11, 1927.

1,644,779

UNITED STATES PATENT OFFICE.

WILLIAM E. HAMILTON AND ERNEST J. BAGNALL, OF COLUMBUS, OHIO; ANNA M. BAGNALL EXECUTRIX OF SAID ERNEST J. BAGNALL, DECEASED.

TUNNEL DRIER.

Application filed February 13, 1922. Serial No. 536,161.

This invention relates to a pre-drying apparatus for use separately or in connection with rotary driers or the like, to utilize waste heat from other driers, furnaces, or steam coils, making a complete pre-drying process for loose material such as fuller's earth. The principal object of the invention is to provide an improved, simple and efficient apparatus of this kind for drying material. Other objects of the invention are: to provide a continuous drier of this kind; to continuously stir and move the material dried; to vaporize the moisture and to carry away gases from the material to be dried; to seal one open end of the drier against the passage of hot air therefrom; to provide variable agitating means; and in general, to provide the construction herein shown and described.

In the accompanying drawings, Fig. 1 is a plan view partly in section of a drier constructed in accordance with the principles of this invention; Fig. 2 is a side elevation with parts broken away for clearness, of the drier illustrated in Fig. 1; and Fig. 3 is a sectional view of the drier.

This apparatus comprises upper and lower closed troughs, or tunnels in which is operated a conveyor of two strands of chain or cable with flights attached thereto having scrapers which keep the material in the tunnels stirred and turned in order to constantly bring the undried material in contact with warm dry air. The bottom of the troughs or any portion thereof may also contain steam pipes or other heating means.

Referring now more particularly to the drawings, the upper and lower troughs 1 and 2 are combined in a single structure closed at one end to form the principal part of the frame work of the apparatus and are covered to form a closed duct, the bottom of the upper trough terminating at a distance from the closed end 3 of the complete housing to provide a continuous run for a pair of chains 4 mounted on sprocket wheels 5 at the ends of the housing so that the chains can run continuously in the upper and lower troughs.

The sides of the troughs are formed with shoulders or projections 7 for supporting the chains 4 and connecting the chains are flights 8 to each of which one or more scrapers or fingers 9 are secured in any suitable manner. These fingers extend above and below the flights so that they will engage and stir up material lying at the bottom of the troughs, and will also move the material along in the troughs.

In the bottom of the upper trough 1 are a plurality of pipes 10 connected at the ends to headers 11 and 12, one or both of which may be connected to a source of steam supply or any other hot vapor.

The sprocket wheels 5 at one end of the drier are provided with adjusting screws 13 by means of which the sprocket wheels may be moved to tighten or loosen the chains.

One end of the drier is preferably left open and at this end is a filling hopper 14 and a vapor discharge pipe 15 in the upper trough and a discharge spout 16 at the bottom of the lower trough 2.

At one side of the drier is a fan 17 enclosed in a housing 18 connected through the side of th lower trough 2 and having an inlet pipe 19 which furnishes a supply of air or other gases preferably heated or dry and suitable for drying purposes. In order to prevent the escape of the dry gases from the lower run of the apparatus, a plurality of doors 20 are hinged in the top of the lower run which are adapted to be engaged by the chain flights in passing and to open the doors in succession, the doors being so spaced as to form a seal to prevent the rapid escape of the dry gases from this end of the trough. The doors are returned to their normal upright position by springs or by gravity, and a similar arrangement may be used at any point along the conveyor for a similar purpose.

In order to drive the chains 4 the sprockets 5 at one end are mounted on a common shaft 6 and an outside driving gear 21 meshes with a gear 22 mounted on the shaft 23 of a pulley 24 driven by a belt 25. Also mounted on this shaft is a gear connection 26 with a shaft 27 for driving the fan 17. In operation, the driving means moves the upper portion of the chain from left to right and the lower run of the chain in the opposite direction. The fan forces air into the lower closed trough, which is closed at one end by the doors 20, so that the air moves to the closed end 3 and thence through the upper run in the opposite direction until it reaches the opening 15 where it is discharged.

Material to be dried is placed in the hopper 14 and falls to the bottom of the upper trough upon the pipes 10 until it reaches the height of the lower side of the flights, or until carried to the right by the scraper fingers. As the pipes 10 are hot, the material is heated sufficiently to prevent the condensation of moisture from the gases passing over it, and by contact with the gases some of the moisture is absorbed and carried off through the discharge. As the conveyor flights pass the material, the scraper fingers stir and turn the hotter portion up to the air allowing the cooler material to fall down in contact with the hot pipes, thus allowing the material to be alternately heated, exposed to the air, and cooled by the evaporation of moisture. During this stirring process the material is moved slowly along the trough to the right and when it reaches the end of the upper trough drops to the lower trough or runway where the same stirring process is continued by the upper end of the scraper finger 9, after the flights of the chain have turned over the sprockets at the right hand end.

As the material approaches the discharge spout 16, it has lost most of its moisture, but as the flow of air is in a direction opposite to the travel of the material the air is fresh and dry near the discharge point of the material and hence absorbs the water more completely from the material, thus leaving it drier and at a lower temperature than would otherwise be possible.

During the passage of material over the hot pipes or the heated trough bottom, any part of the material becoming dried also loses weight due to the loss of the contained moisture and therefore due to its relative lightness has a tendency to rise to the top of the stirred mass of material. As it rises to the top of the material lying in the trough, it reaches the level of the conveyor flights which at once carry or scrape it forward toward the discharge, or until it mixes with material drier and lighter than it, and consequently falls again in contact with the heated trough bottom while drier material displaced by it is carried by the flights to the discharge spout.

The machine and system is also adapted to the drying of materials that do not permit of a high heat being used, the drying effect of the system depending upon the absorbtion of moisture from the material to be dried by dry air in close contact with the material at any temperature, the only limiting condition being that the air or other gases used are below their saturation point at the temperature used.

This machine is also adapted to the drying of materials that cannot be subjected to the more severe rolling and mixing process common in rotary driers, or to the drying of highly combustible materials, as no direct heat is necessary in the process nor is the material exposed to contact with flames or highly heated surfaces. The machine is especially adapted to use in connection with rotary or other driers where a reduction in the moisture in the material makes it more easily handled in the drier, which the crushing or other process do not require, as it is adapted to the use of waste heat by radiation, convection or conduction from such driers, making efficient use of gas or liquid of low temperature heretofore a complete loss by radiation.

We claim:

1. A tunnel drier enclosed at one end having upper and lower trough portions, a pair of endless chains mounted to move in opposite directions in the trough portions, flights connecting the chains, means adjustable on the flights for engaging material in the different troughs.

2. In a drier having upper and lower runs, an endless conveyor movable oppositely in the runs, and adjustable means carried by the conveyor and adapted to engage material in one run at a certain depth and in the other run at the same or a different depth.

3. In a drier, a covered passageway and means including flights for moving material therethrough, a vapor discharge opening at the inlet end of the passageway, a hot vapor inlet adjacent the other end of the passageway, and means in the passageway adjacent the discharge end for directing the passage of vapor away from the discharge end to insure that the hot vapor will be moved in the trough in a direction opposite to the movement of material to be dried therein.

4. In a drier, an enclosed passageway having an inlet at one end and a discharge at the other, means for moving material continuously through the passageway, heating means adjacent the feeding end of the passageway, a hot vapor inlet adjacent the discharge end of the passageway, and a plurality of hinged doors at the discharge end of the passageway engaged by said moving means for preventing the passage of vapor from the passageway in the discharge direction.

5. In a drier, the combination with an enclosed passageway having a feeding end and a discharge end, of means for stirring and moving material continuously in the passageway, said means comprising an endless conveyor, a fan for forcing vapor into the passageway adjacent the discharge end, and common driving means for the conveyor and fan.

6. In a drier of the character set forth, the combination with an elongated box having a series of longitudinally arranged drying pipes in the bottom thereof, of means for moving material along said pipes and simultaneously stirring the material in order to expose the heated material to the drying agent.

7. In a drier, the combination with a closed trough, of a conveyor adapted to move and stir material in the trough, said conveyor having laterally adjustable flights substantially as described.

WILLIAM E. HAMILTON.
ERNEST J. BAGNALL.